United States Patent
Ell et al.

(10) Patent No.: US 6,490,118 B1
(45) Date of Patent: Dec. 3, 2002

(54) ADAPTIVE H-INFINITY HARDWARE CONTROLLER FOR DISC DRIVE ACTUATOR CONTROL

(75) Inventors: Travis E. Ell, Oklahoma City, OK (US); Virat Thantrakul, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/557,630

(22) Filed: Apr. 21, 2000

Related U.S. Application Data

(60) Provisional application No. 60/130,289, filed on Apr. 21, 1999.

(51) Int. Cl.[7] .............................................. G11B 5/596
(52) U.S. Cl. ............................. 360/77.04; 360/77.02; 360/78.05; 360/78.09
(58) Field of Search ........................... 360/77.02, 77.04, 360/78.04, 78.09, 78.05, 78.07, 77.07, 77.08, 77.11, 61, 63

(56) References Cited

U.S. PATENT DOCUMENTS

| | | | |
|---|---|---|---|
| 3,777,130 A | 12/1973 | Croisier et al. | |
| 3,911,345 A | 10/1975 | Totten | |
| 4,064,444 A | 12/1977 | Hoang | |
| 4,353,019 A | 10/1982 | Sweeney, Jr. | |
| 4,412,161 A | 10/1983 | Cornaby | |
| 5,132,852 A | 7/1992 | Price, Jr. | |
| 5,270,882 A | 12/1993 | Jove et al. | |
| 5,432,395 A | 7/1995 | Grahn | |
| 5,657,188 A | 8/1997 | Jurgenson et al. | |
| 5,677,809 A | 10/1997 | Kadlec | |
| 5,711,063 A | 1/1998 | Budde et al. | |
| 5,734,246 A | 3/1998 | Falangas | |
| 5,745,319 A | 4/1998 | Takekado et al. | |
| 5,903,085 A | 5/1999 | Karam | |
| 5,978,752 A | 11/1999 | Morris | |
| 6,002,549 A | 12/1999 | Berman et al. | |
| 6,101,058 A | * 8/2000 | Morris | 360/69 |
| 6,414,827 B1 | * 7/2002 | Young et al. | 360/78.09 |
| 2002/0012189 A1 | * 1/2002 | Ikai | 360/77.02 |

FOREIGN PATENT DOCUMENTS

WO    WO 99/08268    2/1999

OTHER PUBLICATIONS

Abraham Peled and Bede Liu, "A New Hardware Realization of Digital Filters", *IEEE Trans. On Acoustic Speech and Signal Processing*, Dec. 1974, pp. 456–462, vol. ASSP–22, No. 6, USA.

Pye TMC Limited, pp. 254–264, 392, C.G. 75. 2M, England.

National Semiconductor datasheet, 54F/74F410–16×4 RAM TRI–STATE® Output Register, Aug. 1995.

* cited by examiner

*Primary Examiner*—Andrew L. Sniezek
(74) *Attorney, Agent, or Firm*—Fellers, Snider, et al.

(57) ABSTRACT

Apparatus and method for generating control inputs for a disc drive dual stage actuator having primary and secondary actuator motors used to maintain a head adjacent a rotatable disc surface. An h-infinity hardware controller generates the control inputs in relation to an actual position signal, a desired position signal and a unique set of coefficients for each selected head. The coefficients are selected by obtaining an output response for each head, selecting the coefficients in relation to the output response for each head, and storing the coefficients in a nonvolatile memory location of the disc drive. The appropriate set of coefficients are thereafter loaded as each head is selected in turn during normal drive operation.

17 Claims, 7 Drawing Sheets

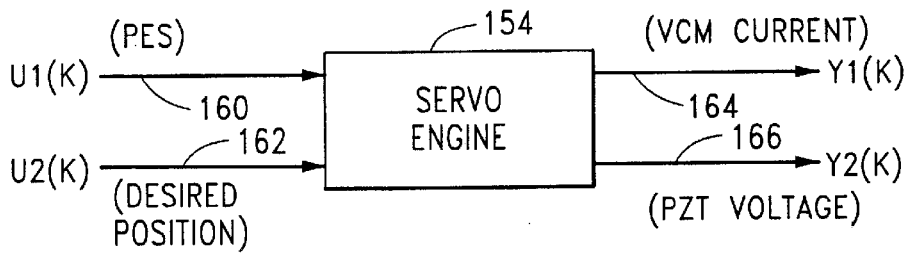

FIG. 3

$$A_C = \begin{pmatrix} \alpha_1 & -\alpha_3 & 0 & 0 & 0 & 0 & 0 & 0 & 0 & 0 \\ \alpha_3 & \alpha_2 & 0 & 0 & 0 & 0 & 0 & 0 & 0 & 0 \\ 0 & 0 & \alpha_4 & -\alpha_6 & 0 & 0 & 0 & 0 & 0 & 0 \\ 0 & 0 & \alpha_6 & \alpha_5 & 0 & 0 & 0 & 0 & 0 & 0 \\ 0 & 0 & 0 & 0 & \alpha_7 & -\alpha_9 & 0 & 0 & 0 & 0 \\ 0 & 0 & 0 & 0 & \alpha_9 & \alpha_8 & 0 & 0 & 0 & 0 \\ 0 & 0 & 0 & 0 & 0 & 0 & \alpha_{10} & -\alpha_{12} & 0 & 0 \\ 0 & 0 & 0 & 0 & 0 & 0 & \alpha_{12} & \alpha_{11} & 0 & 0 \\ 0 & 0 & 0 & 0 & 0 & 0 & 0 & 0 & \alpha_{13} & -\alpha_{15} \\ 0 & 0 & 0 & 0 & 0 & 0 & 0 & 0 & \alpha_{15} & \alpha_{14} \end{pmatrix}$$

$$B_C = \begin{pmatrix} \beta_1 & \beta_2 \\ \beta_3 & \beta_4 \\ \beta_5 & \beta_6 \\ \beta_7 & \beta_8 \\ \beta_9 & \beta_{10} \\ \beta_{11} & \beta_{12} \\ \beta_{13} & \beta_{14} \\ \beta_{15} & \beta_{16} \\ \beta_{17} & \beta_{18} \\ \beta_{19} & \beta_{20} \end{pmatrix} \quad C_C = \begin{pmatrix} \gamma_1 & \gamma_3 & \gamma_5 & \gamma_7 & \gamma_9 & \gamma_{11} & \gamma_{13} & \gamma_{15} & \gamma_{17} & \gamma_{19} \\ \gamma_2 & \gamma_4 & \gamma_6 & \gamma_8 & \gamma_{10} & \gamma_{12} & \gamma_{14} & \gamma_{16} & \gamma_{18} & \gamma_{20} \end{pmatrix}$$

$$D_C = \begin{pmatrix} \delta_1 & \delta_3 \\ \delta_2 & \delta_4 \end{pmatrix}$$

FIG. 4

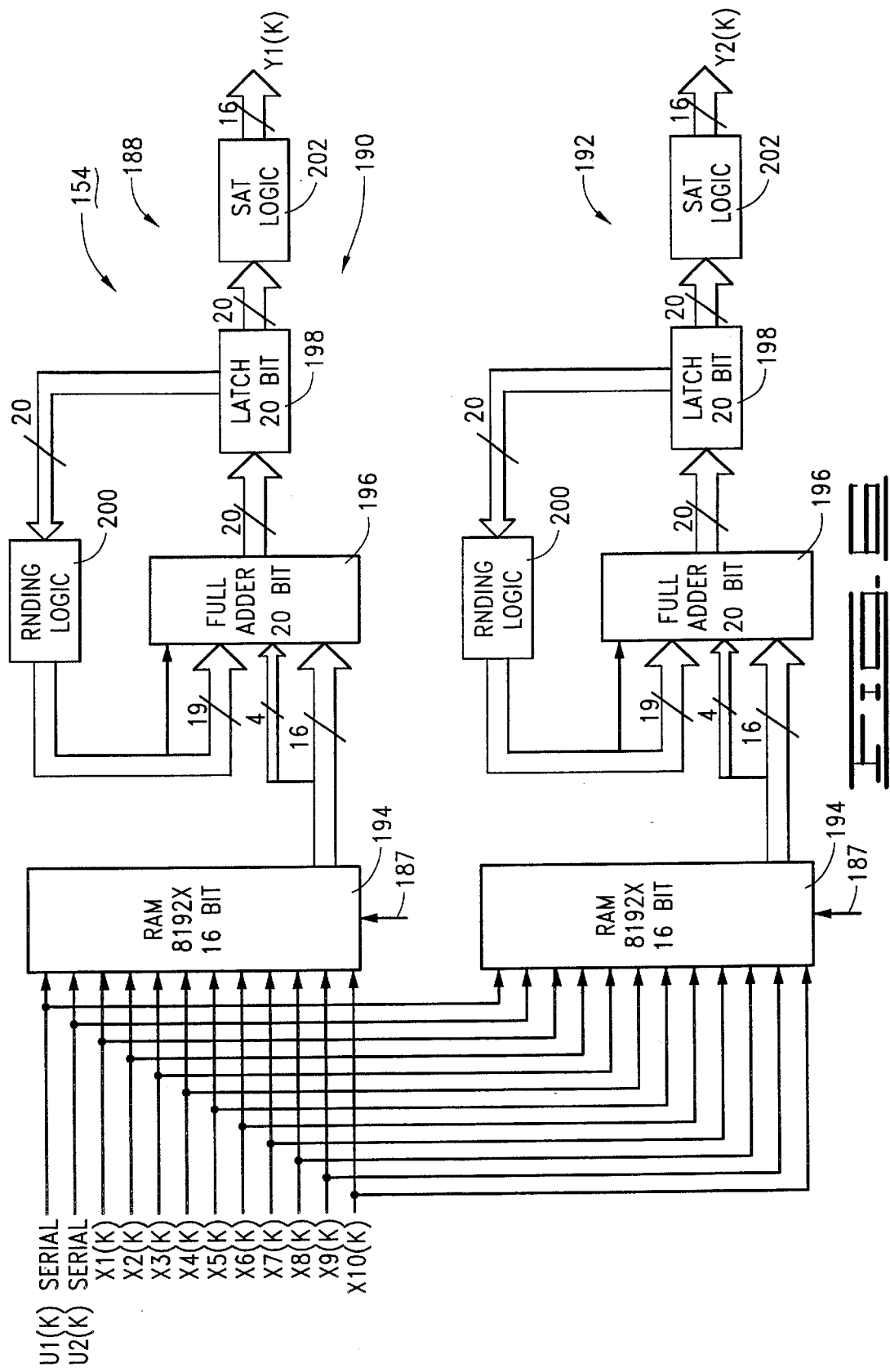

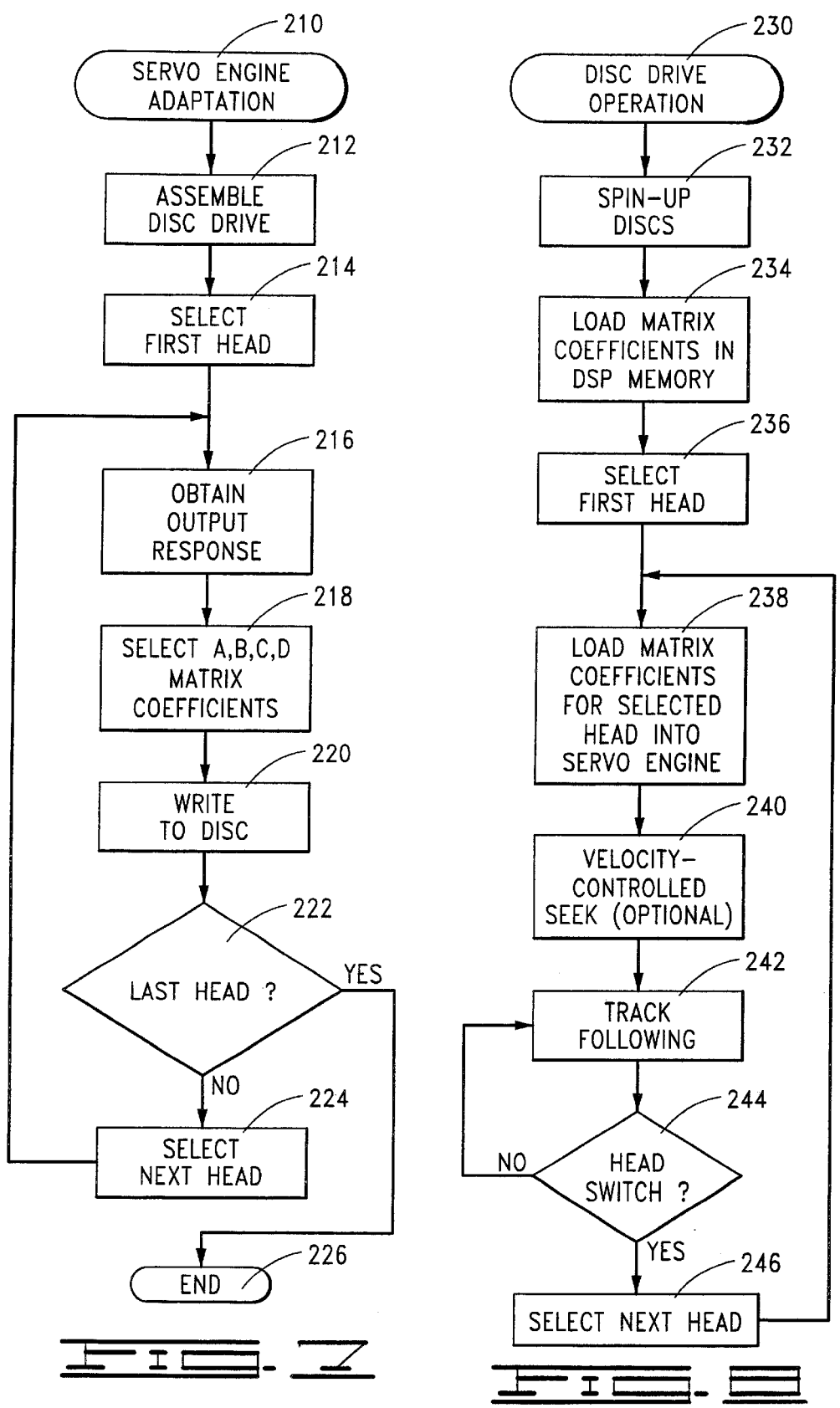

ADAPTIVE H-INFINITY HARDWARE CONTROLLER FOR DISC DRIVE ACTUATOR CONTROL

RELATED APPLICATIONS

This application claims priority to United States Provisional Application No. 60/130,289 filed Apr. 21, 1999.

FIELD OF THE INVENTION

This invention relates generally to the field of magnetic data storage devices, and more particularly, but not by way of limitation, to an h-infinity controller which provides control inputs to a disc drive actuator to maintain a head adjacent a selected track on a rotatable disc.

BACKGROUND

Disc drives are used as primary data storage devices in modern computer systems and networks. A typical disc drive comprises a head-disc assembly (HDA) which houses mechanical portions of the drive, and a printed circuit board (PCB) mounted to an outer surface of the HDA which supports electronic circuitry used to control the HDA.

A typical HDA includes one or more rigid magnetic storage discs which are journaled about a rotary hub of a spindle motor to form a rotatable disc pack, and an actuator assembly which supports an array of heads adjacent tracks defined on the disc surfaces. An actuator motor, such as a voice coil motor (VCM), rotates the actuator assembly, and hence the heads, across the disc surfaces. The control circuitry on the PCB includes a read/write channel which interfaces with the heads to transfer data between the tracks and a host computer, and a servo control system which drives the VCM to provide head positional control.

Continued demand for disc drives with ever increasing levels of data storage capacity have led disc drive manufacturers to seek ways to increase the density of data bits that are stored on each disc surface. High performance disc drives of the present generation typically achieve area bit densities measured in several gigabits per square centimeter, Gbits/cm$^2$. Higher recording densities can be achieved by increasing the number of bits that are stored along each track, and/or by increasing the number of tracks per unit width across each disc. Storing more bits along each track generally requires improvements in the read/write channel electronics to enable the data to be written (and subsequently read) at a correspondingly higher frequency. Providing higher track densities generally requires improvements in the servo control system to enable the heads to be more precisely positioned over the discs.

In an effort to achieve higher track densities, disc drive manufacturers are increasingly moving to implement so-called "microactuators," which are secondary motors suspended by actuator assemblies to provide fine (secondary) positional adjustment of the heads over and above the coarse (primary) positional adjustment provided by the VCMs. A variety of microactuator constructions have been recently proposed in the art, including the use of an inductive rotor/stator arrangement as exemplified by U.S. Pat. No. 5,657,188 issued to Jurgenson et al.; the use of piezoelectric transducers as exemplified by U.S. Pat. No. 6,002,549 issued to Berman et al.; and microelectronic machine (MEM) implementations as discussed in U.S. Pat. No. 5,711,063 issued to Budde et al.

The basic operational concept of an actuator assembly with both primary and secondary motors (also referred to as a "dual-stage" actuator) is relatively straightforward; the primary motor is used to bring the selected head within a given range of tracks, after which the secondary motor operates to bring the head over one particular selected track from the range of tracks. Implementation of the servo control electronics to provide the necessary control signals to the primary and secondary motors, however, has thus far proved to be a rather daunting task.

At present, one proposed solution is to provide a high performance programmable device (such as a digital signal processor, or DSP) with extensive programming algorithms in order to carry out the required dual-stage servo control. Such an approach is discussed, for example, by United States Pat. No. 5,978,752 issued to Morris. While operable, there is a continued need for robust and cost-effective controller solutions that can be implemented for both high performance single stage and dual stage actuators in a cost-effective manner and which are easily adapted to different design configurations and to different head/media combinations.

SUMMARY OF THE INVENTION

The present invention provides an apparatus and method for improving disc drive actuator control.

In accordance with preferred embodiments, a disc drive is provided with a rotatable actuator which supports an array of read/write heads adjacent a corresponding number of recording surfaces in a rotatable disc stack. A servo engine, characterized as a high-speed hardware circuit, generates control inputs for the actuator to carry out track following operations wherein a selected head is caused to follow a corresponding track.

The actuator can be characterized as a single-stage actuator having a single actuator motor (such as a voice coil motor, VCM), or alternatively can be characterized as a dual-stage actuator having both a primary actuator motor (VCM) and an array of secondary microactuators which controllably move each head. The control inputs for the motor or motors are determined in relation to an actual position signal for the head, a desired position signal for the head and a unique set of coefficients, or table lookup values, that are individually determined and loaded for each head.

The coefficients are selected by obtaining an output response for each head, selecting the coefficients in relation to the output response for each head, and storing the coefficients in a nonvolatile memory location of the disc drive. The appropriate set of coefficients is thereafter loaded into the hardware controller as each head is selected in turn during normal drive operation.

Each set of coefficients comprises the results of intermediate calculations for state equations used to determine the control input values. In this way, the hardware controller efficiently obtains solutions for the control inputs for the primary and secondary motors in a number of clock cycles corresponding to the length of the multi-bit input (actual position and desired position) words, by serializing the input words and using these as addresses to access the appropriate coefficients. The hardware controller further advantageously allows track following operations to be offloaded from a programmable processor of the disc drive, which enables the disc drive design to utilize a single processor for top level control of data transfer operations and velocity controlled seek operations.

The use of different sets of coefficients by head enables the hardware controller to be adapted for each head/disc combination. That is, as each new head is selected, a new set of table lookup values appropriate for the new head are loaded into the hardware controller, providing accurate, adaptive control. Moreover, dual-state actuators have inherently complex response characteristics, and the use of h-infinity controller synthesis provides an efficient way to reduce the uncertainties associated with dual-stage actuator design.

The servo engine is advantageously incorporated into an application specific integrated circuit (ASIC) housing other related circuits of the disc drive, such as demodulation (demod) circuitry used to condition servo signals readback from the disc surfaces. A special purpose random access memory (RAM) configuration is used to significantly reduce the time required to load each set of coefficients as each new head is selected in turn.

These and various other features and advantages which characterize the present invention will be apparent from a reading of the following detailed description and a review of the associated drawings.

BRIEF DESCRIPTION OF THE DRAWINGS

FIG. 4 shows Ac, Bc, Cc and Dc state matrices which control the operation of the servo engine of FIG. 3, with the coefficients of the state matrices selected in accordance with preferred embodiments of the present invention.

FIGS. 5 and 6 provide generalized schematic diagrams illustrating a preferred construction for the servo engine of FIG. 3.

FIG. 7 is a flow chart for a SERVO ENGINE ADAPTATION routine, illustrating steps carried out in accordance with preferred embodiments of the present invention to select appropriate coefficients for the state matrices of FIG. 4 during disc drive manufacturing, preferably on a per-head basis.

FIG. 8 is a flow chart for a DISC DRIVE OPERATION routine, illustrating steps carried out during operation of the disc drive of FIG. 1 in accordance with preferred embodiments of the present invention.

FIG. 9 is a functional block diagram for a special purpose random access memory (RAM) configuration which is advantageously used for the RAM devices shown in the circuits of FIGS. 5 and 6 to significantly reduce the time required to load the sets of coefficients into these devices as each new head is selected in turn.

DETAILED DESCRIPTION

Figure 1:
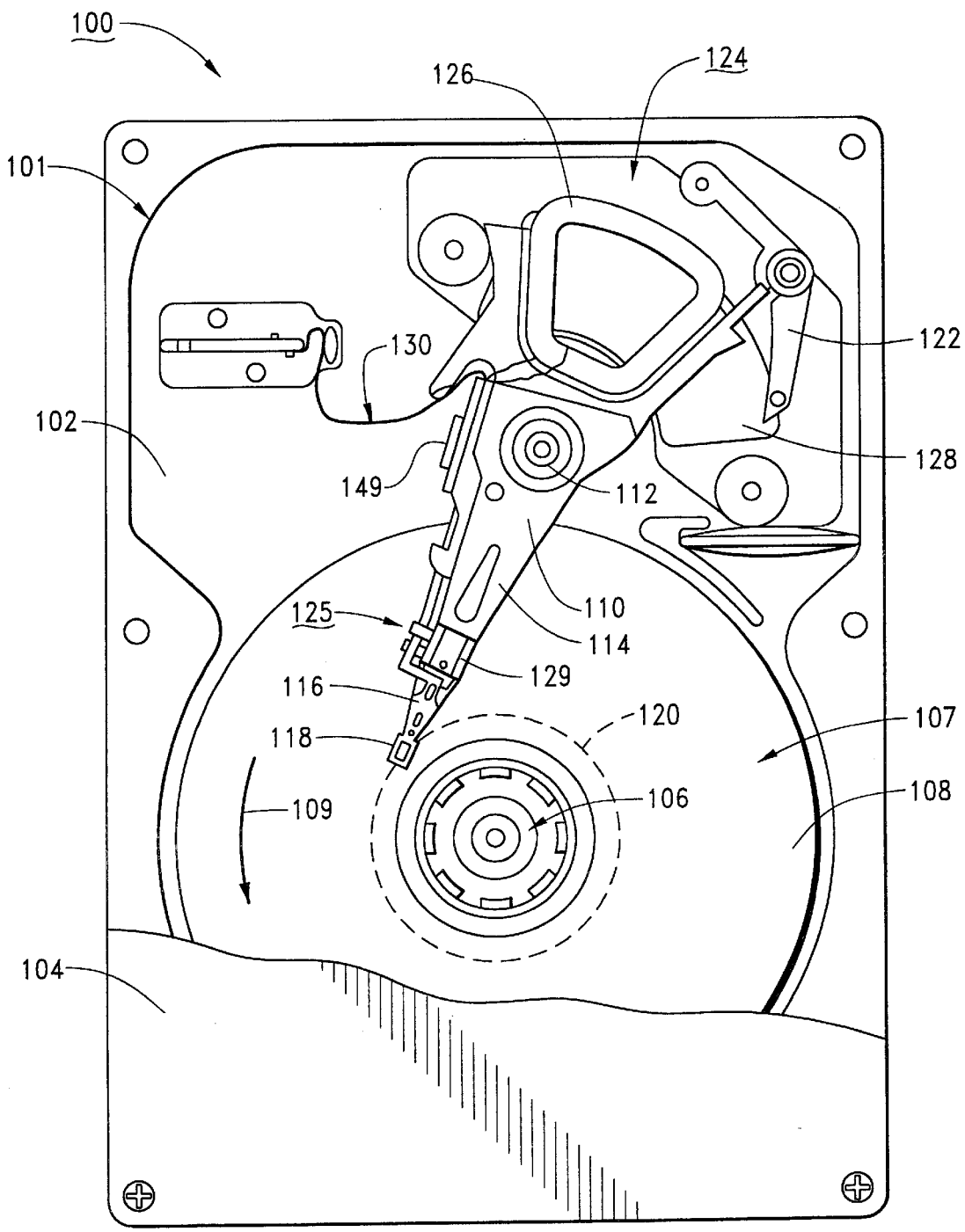
FIG. 1 is a top plan view of a disc drive with a dual-stage actuator which is controlled in accordance with preferred embodiments of the present invention.

Referring to FIG. 1, shown therein is a top plan view of a disc drive 100 used to store computerized data. The disc drive 100 includes a head-disc assembly (HDA) 101 which houses various mechanical portions of the drive. A printed circuit board (PCB, not shown) is mounted to the underside of the HDA 101 to complete the disc drive 100, with the PCB supporting electronic circuits used to control the operation of the HDA 101.

The HDA 101 includes a base deck 102 and a top cover 104 (shown in partial cutaway fashion) which cooperate to form an enclosure with a controlled internal environment for the disc drive 100. During operation, a spindle motor 106 rotates a disc pack 107 comprising a plurality of axially aligned magnetic recording discs 108 in an angular direction indicated by arrow 109. For reference, the disc drive 100 is contemplated as having overall dimensions of about 15 centimeters, cm (5.75 inches, in) by about 10 cm (4 in) by about 2.5 cm (1 in), so as to have what is commonly referred to in the industry as a "three and one-half inch, low profile" form factor. The discs 108 each have a nominal diameter of about 8.4 cm (3.3 in). It will be noted, however, that the foregoing dimensions are provided merely for purposes of illustration and the scope of the claimed invention is not limited to disc drives having these particular dimensions.

User data are written to and read from tracks (not depicted) on the discs 108 through the use of an actuator 110, which rotates about a bearing shaft assembly 112 adjacent the discs 108. The actuator 110 includes a plurality of rigid actuator arms 114 which support flexible suspension assemblies 116 (flexures). A head 118 is supported at the end of each flexure 116. The heads 118 are configured to be aerodynamically supported over the discs 108 while the discs 108 are rotated at operational speed.

The actuator 110 is characterized as a "dual-stage" actuator, in that the actuator has a primary actuator motor (voice coil motor 124) which provides coarse positional control, and an array of secondary actuator motors (microactuators 125) which provide fine positional control. The voice coil motor (VCM) 124 comprises an actuator coil 126 and a magnetic circuit including permanent magnet 128; application of current to the coil 126 generates a magnetic field which interacts with the magnetic field of the permanent magnet 128, thereby causing the actuator 110 to pivot about the bearing shaft assembly 112 to bring the selected head within a particular range of tracks.

Each microactuator (MA) 125 includes a pair of piezoelectric transducers 129 which expand and contract in response to the application of a piezoelectric transducer (PZT) voltage, thereby causing the selected head 118 to move over a particular, selected track from the range of tracks. Control signals for the VCM 124 and the microactuators 125, and read/write signals for the heads 118, are passed between the actuator 110 and the disc drive PCB via a flex circuit assembly 130.

It will be understood that the top and bottom microactuators 125 each support one flexure 116 (and hence, one head 118), while intermediate microactuators 125 within the disc pack 107 support two flexures 116 (and hence, two heads 118). Since it is contemplated that only one head 118 will be selected at a time, servo control signals are generated for the VCM and the appropriate microactuator 125 in order to carry out the desired servo control for the selected head; switching to a new head may result in the use of a different microactuator 125 appropriate for the new head. Although a dual-stage actuator 110 has been presented for purposes of the present discussion, the present invention is not so limited and can readily be used in a disc drive with a single-stage actuator having only a single actuator motor 124.

The circuitry of the PCB will now be discussed with reference to FIG. 2, which provides a functional block diagram of the disc drive 100 of FIG. 1 in conjunction with a host computer 140 in which the disc drive is mounted. A programmable processing device, characterized as a digital signal processor (DSP) 142, provides top level control of the disc drive in response to programming stored in DSP memory (MEM) 144 and command inputs from the host computer 140. Data are transferred between the host computer 140 and the discs 108 along a communication path including an interface (I/F) circuit 146, read/write channel 148 and preamplifier/driver (preamp) 149. The preamp 149 is affixed to the actuator 110, as shown in FIG. 1.

Head positional control is provided by a closed loop servo circuit 150 comprising a demodulator (demod) 152, a hardware-based servo controller ("servo engine") 154, a set of digital to analog converters (DACs) 156 and a motor driver circuit 158. The demodulator 152 conditions servo data transduced from the disc 108 to provide an indication of the position of the head 118. The servo engine 154 generates command signals which are converted by the DACs 156 for use by the motor driver 158.

As discussed in greater detail below, the servo engine 154 is an input/output hardware controller that operates to generate appropriate command signals for the VCM 124 and the MA 125 during track following modes of operation to cause the selected head 118 to follow a corresponding track. The servo engine 154 is preferably designed using h-infinity synthesis techniques to account for uncertainties related to actuator resonances. It will be noted that the servo engine 154 allows track following control tasks to be offloaded from the DSP 142, freeing the DSP 142 to be used for seeking operations (wherein a selected head is moved from one track to the next using velocity-control techniques) and to provide top level control for the transfer of data with the host computer 140.

Figure 3:
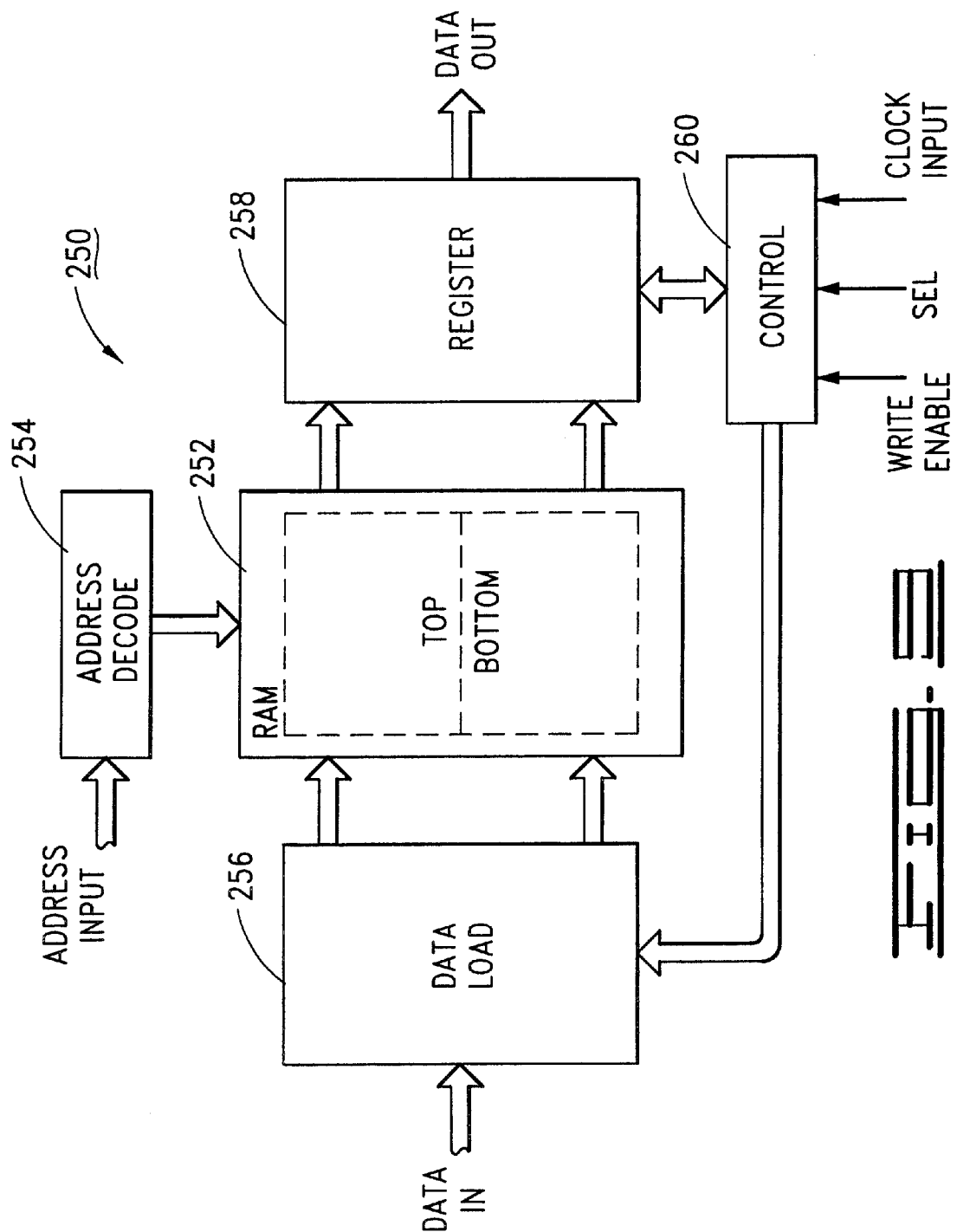
FIG. 3 provides a simplified block diagram showing the respective inputs and outputs of the servo engine of FIG. 2.

FIG. 3 shows the servo engine 154 to receive two primary digital inputs: U1(k) on signal path 160 and U2(k) on signal path 162. The U1(k) input is provided by the demodulator 152 and indicates position of the selected head 118 (preferably derived from a position error signal, PES). The U2(k) input is provided by the DSP 142 and indicates desired position of the head.

The servo engine 154 processes these inputs to provide two primary digital outputs: Y1(k) on signal path 164 and Y2(k) on signal path 166. The Y1(k) output is a current command signal for the VCM 124 and provides coarse positional control for the actuator 110. The Y2(k) output is a PZT voltage for the MA 125 to provide fine positional control for the actuator 110. The servo engine 154 generates the Y1(k) and Y2(k) outputs in accordance with the following well-known state-space equations:

$$X(k+1)=Ac \cdot X(k)+Bc \cdot U(k) \qquad (1)$$

$$Y(k)=Cc \cdot X(k)+Dc \cdot U(k) \qquad (2)$$

where k is the servo sample, X(k) is internal state of the controller, and state space matrices Ac, Bc, Cc and Dc nominally define the transfer function characteristics of the controller. The matrices have a general form as shown by FIG. 4. It will be noted that the matrices of FIG. 4 are 10th order and have been placed in bidiagonal form to simplify the number of necessary calculations to obtain each state. The particular manner in which the coefficients for these matrices are selected and loaded will be discussed after a review of the construction and operation of the servo engine 154, as set forth in FIGS. 5 and 6.

Figure 5:
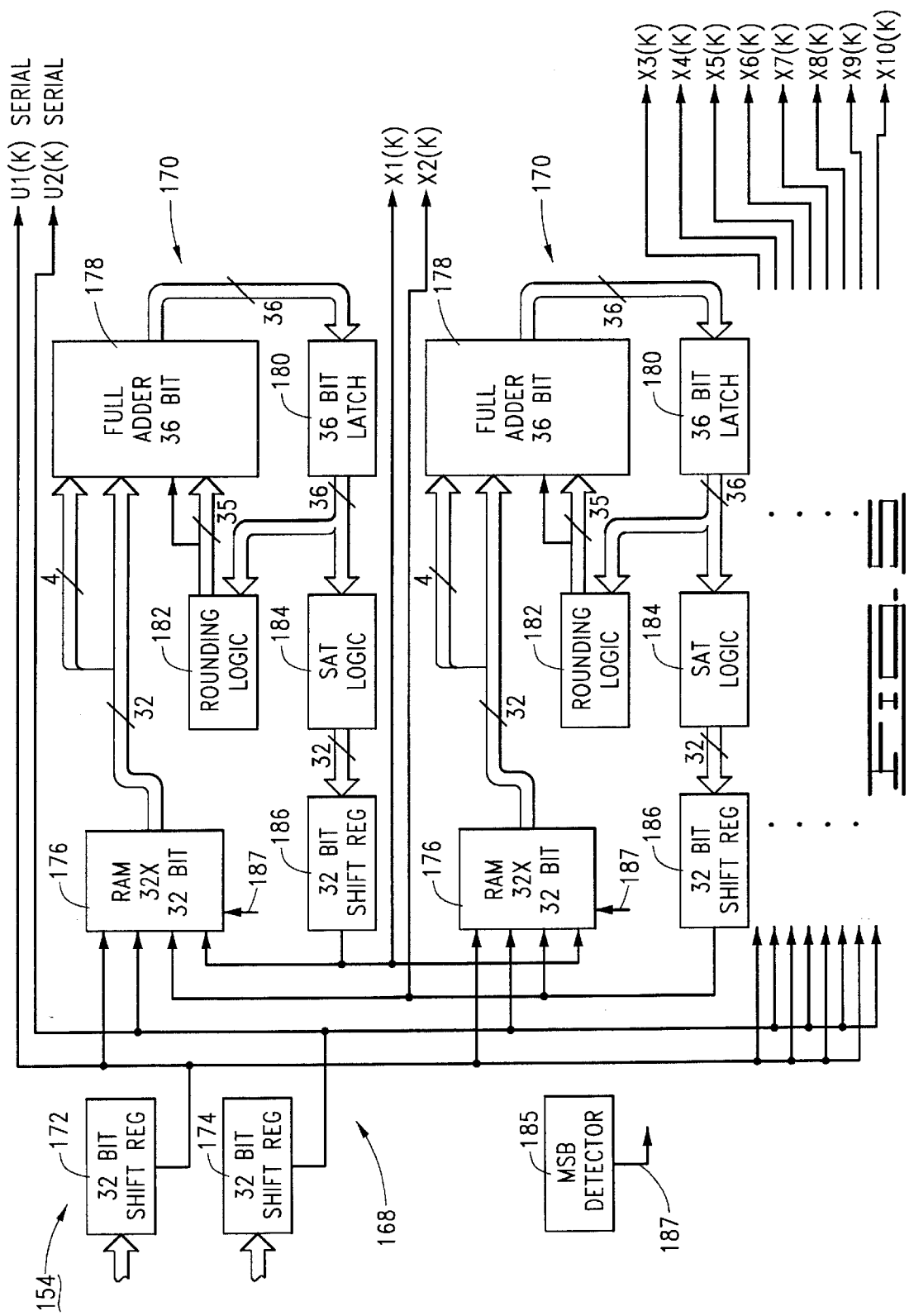

Generally, the servo engine 154 operates as a multi-stage input/output controller. The results of intermediate arithmetic operations are stored and used to obtain subsequent output values through repeated addition and shifting operations. This allows state equations (1) and (2) to be solved without the need for multipliers in the circuit. FIG. 5 provides a schematic block diagram of an X(k+1) module 168 of the servo engine 154, which operates to provide a hardware solution of equation (1). A total of ten stages 170 are provided in parallel to solve for each of the X(k) states. Only two of these 10 stages 170 are shown; the remaining stages are configured in like manner.

Each of the stages 170 operates to calculate the corresponding state in a number of clock cycles (from a separate clock, not shown) corresponding to the resolution of the U1(k) and U2(k) inputs. It is contemplated that the U1(k) and U2(k) inputs have 32 bit resolution; thus, at the end of 32 clock cycles, the outputs from the stages 170 comprise the internal state vector X(k+1).

A pair of 32 bit shift registers 172, 174 receive and serialize (from least significant bit, LSB, to most significant bit, MSB), the respective U1(k) and U2(k) words. Each stage 170 includes a 32×32 bit random access memory (RAM) 176, adder 178, latch 180, rounding logic 182, saturation logic 184, and shift register 186. A most significant bit (MSB) detector 185, preferably a 32 bit counter, keeps track of the bits shifted through the registers 172, 174 and toggles an output line (path 187) when the MSBs from the U1(k) and U2(k) words are output from the shift registers 172, 174.

FIG. 6 provides a corresponding schematic diagram for a Y(k) module 188 of the servo engine 154, which operates to provide a hardware solution of equation (2) above. A VCM control stage 190 operates to generate the VCM command output Y1(k), and an MA control stage 192 operates to generate the MA command output Y2(k). Each of the stages 190, 192 includes an 8192×16 bit RAM 194, an adder 196, a latch 198, rounding logic 200 and saturation logic 202. It will be noted that the general form of the stages 190, 192 are similar to the form of the stages 170 of FIG. 5, and operate in similar fashion.

With reference again to FIG. 5, at each servo sample, the respective U1(k) and U2(k) inputs are loaded into the corresponding 32 bit shift registers 172, 174 to provide corresponding serial bit outputs (denoted "U1(k) serial" and "U2(k) serial"). The serial bits from the U1(k) and U2(k) inputs are sequentially provided as two of the five address inputs for each of the 32×32 bit RAMs 176. The previously calculated X1(k) and X2(k) states are also used to provide two of the address inputs, as shown (X3(k) and X4(k) provide address inputs for the next two stages 170, etc.).

The RAM 176 operates as a lookup table to output corresponding precalculated values to the adder 178 (four sign extension bits are provided for overflow). The output of the adder 178 is latched and output by the latch 180 to the rounding logic 182, which performs a rounding operation as the LSB is dropped and the bits are shifted on each iteration. The saturation logic 184 operates to prevent overflow conditions (i.e., flipping from the largest two's complement to the smallest two's complement value) during the intermediate calculations.

Each successive output from the respective lookup tables (RAMs 176, 194) is a factor of two greater than the previous output, since the previous output is shifted to the right and added to the present output. Since the inputs U1(k) and U2(k) are contemplated as being in two's complement form, the last output corresponding to the MSB is not only a factor of two greater than the previous output, but it is also a "negative" factor of two; hence, an extra address line is added which doubles the size of each RAM. This eliminates the need for a subtractor to handle the MSB output term.

For example, with reference to the topmost stage 170, the five address input bits {A5, A4, A3, A2, A1} for the RAM 176 are identified in order as: the output of the MSB detector 185; X1(k); X2(k); U1(k); and U2(k). The MSB detector output will be low, or 0, for the first 31 clock cycles and then will toggle high, or 1, at the 32nd clock cycle. The X1(k) and X2(k) state bits can each be either 0 or 1, depending on the previously calculated state, and will be updated at the end of each sample period. The U1(k) and U2(k) bits will vary for each of the 32 clock cycles depending on the values of the U1(k) and U2(k) input words. Using equation (1) and the Ac, Bc matrices of FIG. 4, intermediate calculation values for selected address locations in the top RAM 176 are illustrated in Table 1 below.

TABLE 1

| A5–A1 Bits | Table Lookup Value |
|---|---|
| 0, 0, 0, 0, 0 | $X1(k + 1) = (0)(0) + (0)(0) + (0)(0) + (0)(0) = 0$ |
| 0, 1, 0, 1, 0 | $X1(k + 1) = (1)(\alpha_1) + (0)(-\alpha 3) + (1)(\beta_1) + (0)(\beta_2)$ |
| 0, 1, 1, 1, 1 | $X1(k + 1) = (1)(\alpha_1) + (0)(-\alpha_3) + (1)(\beta_1) + (0)(\beta_2)$ |
| 1, 1, 0, 1, 0 | $X1(k + 1) = (-1)[(1)(\alpha_1) + (0)(-\alpha 3) + (1)(\beta_1) + (0)(\beta_2)]$ |

It will be noted that the values of the four address bits A1–A4 determine the magnitude of the resulting 16 different calculations. A high MSB address bit A5 converts the value determined by the A1–A4 address bits into a negative value. Thus, each of the RAMs 176 is divided into two halves: the "bottom" half (A5=0) with the 16 different calculations determined by the values of A1–A4, and the "top" half (A5=1) which store the negative of the same 16 calculations (i.e., the bottom values multiplied by −1).

The Y(k) module 190 operates in similar fashion. The ten X(k) states, the U1(k) serial and U2(k) serial values, and the MSB detection bit from FIG. 5 are provided as address inputs (A1–A13) to the 8192×16 bit RAMs 194. The RAMs operate as lookup tables to output precalculated values using equation (2) and the Cc and Dc matrices of FIG. 4. As before, the bottom half of the RAMs 194 are determined by the A1–A12 address bits, and the A13 (MSB) bit accesses corresponding negative values in the top half of the RAMs.

The coefficients for the Ac, Bc, Cc and Dc matrices are preferably selected using h-infinity controller synthesis techniques, which provide robust controller design by identifying and reducing the effects of possible uncertainties in plant response. H-infinity controller synthesis techniques are discussed, for example, by U.S. Pat. No. 5,734,246 issued to Falangas and the aforementioned U.S. Pat. No. 5,978,752 issued to Morris.

FIG. 7 provides a SERVO ENGINE ADAPTATION routine 210, illustrating steps preferably carried out during disc drive manufacturing to adapt the servo engine 154 to each head/disc combination. At step 212, the disc drive 100 is assembled, and the assembled disc drive is placed in an appropriate computer-based workstation (not separately shown). The first head 118 is selected at step 214, and a selected input spectrum is provided as an input to the VCM 124 and the MA 125 in order to obtain a plot of the uncertainties in resonance locations and damping factors for each head. The input spectrum can be a broad band input signal, a sequence of sinusoidal waveforms at increasingly higher frequencies ("swept sine), etc.

The output response information is gathered at step 216 and provided at step 218 to a suitable h-infinity control design routine, such as the Matlab μ-Analysis and Synthesis Toolbox, available from The MathWorks, Inc., Natick, Mass., USA, which provides an initial, robust h-infinity design that minimizes the effects of uncertainties in plant response based on the data obtained at step 216. Once the initial design is obtained, additional routines from the Matlab toolbox, STRUNC and STRANS, are advantageously used to place the controller matrices in bidiagonal form and to reduce the order of the controller, resulting in the Ac, Bc, Cc and Dc matrices of FIG. 4. The corresponding precalculated values for the lookup tables in the RAM 176, 194 are next determined and stored in the disc drive, step 220. One suitable location for these table values is on a guard track on a selected disc beyond the normal data recording surface of the disc.

Decision step 222 inquires whether the selected head 118 is the last head; if not, the next head is selected at step 224 and the process is repeated in turn for each head, until the process ends at step 226. Although it is contemplated that the same controller coefficients could be used for all heads, it is preferable to select different coefficients for each head. The corresponding lookup table values are then loaded into the servo engine 154 at each head switch operation during normal operation, as will now be discussed with reference to FIG. 8.

FIG. 8 provides a DISC DRIVE OPERATION routine 230, and generally illustrates steps carried out during operation of the disc drive 100. Upon initialization (spin-up) at step 232 during which the drive is brought from a state of nonoperation to a state of operation, the table values stored at step 220 of FIG. 7 for all of the heads are retrieved from the guard tracks and stored in DSP memory (such as 144, FIG. 2), as indicated by step 234. The first head is thereafter selected, step 236, and the appropriate table values are transferred from memory 144 to the servo engine 154, step 238.

Step 240 contemplates that a velocity-controlled seek may first occur after the head switch operation, and as discussed above, such a seek is carried out directly by the DSP 142 to bring the selected head over a selected track. Thereafter, the disc drive 100 enters a track following mode of operation and the servo engine 154 operates as described above to maintain the head 118 over the selected track, step 242. More particularly, as the head 118 follows the selected track, servo data are periodically transduced and provided to the servo engine 154 as the U1(k) input and the DSP 142 likewise provides a desired position input U2(k). The servo engine 154 operates, for each servo sample k, to provide the new internal states X(k+1) and a set of control outputs Y1(k), Y2(k) for the VCM 124 and MA 125. This operation continues until a new head is desired, as indicated by decision block 244, after which a new head is selected at step 246 and the routine returns as shown.

Preferably, the servo engine 154 is incorporated into an application specific integrated circuit (ASIC) housing other related circuits of the disc drive 100, such as the demodulation (demod) circuit 152 used to condition the servo signals readback from the disc surfaces. This allows the implementation of a special purpose random access memory (RAM) configuration for the RAM devices 176, 194 of FIGS. 5 and 6 to significantly reduce the time required to load each set of coefficients as each new head 118 is selected in turn. FIG. 9 provides a functional block diagram for this configuration (generally denoted at 250).

The basic layout includes a memory module 252 which is divided into top and bottom halves as shown. For the 32×32 bit RAMs 176, the bottom half (16×32) corresponds to addresses 00000-01111, and the top half (16×32) corresponds to addresses 10000-11111; for the 8192×16 bit RAMs 194, the bottom half (4096×16) corresponds to addresses 0000000000000-0111111111111 and the top half (4096×16) corresponds to addresses 1000000000000-

1111111111111. As discussed above, the contents of the top half are the negative values of the contents of the bottom half.

Multi-bit address inputs are provided to address decode logic 254 to access the memory locations during reading and writing operations. A special data load logic block 256 controls the writing of data to the memory module 252. More particularly, during a write operation, the data to be written to the bottom half of the memory module 252 are sequentially provided to the block 256. In response, the block 256 writes the input data to each memory location in the bottom half while simultaneously calculating the negative of the input data and writing the negative value to the corresponding location in the top half of the memory module 252. In this way, the contents of the memory module 252 are loaded in nominally half the time that would otherwise be normally required. This can provide a significant operational benefit, since the servo engine 154 includes two 8194×16 RAMs 194 and 10 32×32 RAMs 176 and the contents of each of these RAMs are reloaded with each head switch.

The circuit 250 further includes an output register 258 into which output data are loaded from the memory module 252 during a read operation. Control logic 260 controls the operation of the circuit 250 and uses conventional inputs such as write enable, chip select and clock signals.

From the foregoing discussion, it will now be clear that the present invention provides several advantages over the prior art. First, the use of RAM to store the table values enables the controller to be adapted for each head/disc combination. That is, as each new head is selected, a new set of table lookup values appropriate for the new head can be loaded into the servo engine, providing accurate, adaptive control. Second, dual-state actuators have inherently complex response characteristics, and the h-infinity controller methodology provides an efficient way to reduce the uncertainties associated with dual-stage actuator design. Third, the use of an additional address line for each of the RAMs 176, 194 simplifies the hardware by eliminating the need for subtraction logic to handle the MSB, as well as facilitating faster data loading operations at each head switch. Although the preferred embodiments have been directed to a dual-stage actuator, other solutions are readily envisioned, such as a single stage actuator, in which case the Y(k) module 190 of FIG. 6 would only utilize one output stage.

In summary, the present invention is directed to an apparatus and method for generating control inputs for a disc drive dual stage actuator. In accordance with preferred embodiments, a disc drive 100 includes a dual stage actuator 110 having primary and secondary actuator motors 124, 125 used to maintain a head 118 adjacent a rotatable disc 108. An h-infinity hardware controller 154 generates the control inputs in relation to an actual position signal, a desired position signal and a unique set of coefficients for each selected head. The coefficients are selected by obtaining an output response for each head (step 216), selecting the coefficients in relation to the output response for each head (218), and storing the coefficients in a nonvolatile memory location of the disc drive (220). The appropriate set of coefficients are thereafter loaded as each head is selected in turn during normal drive operation (step 238).

Figure 2:
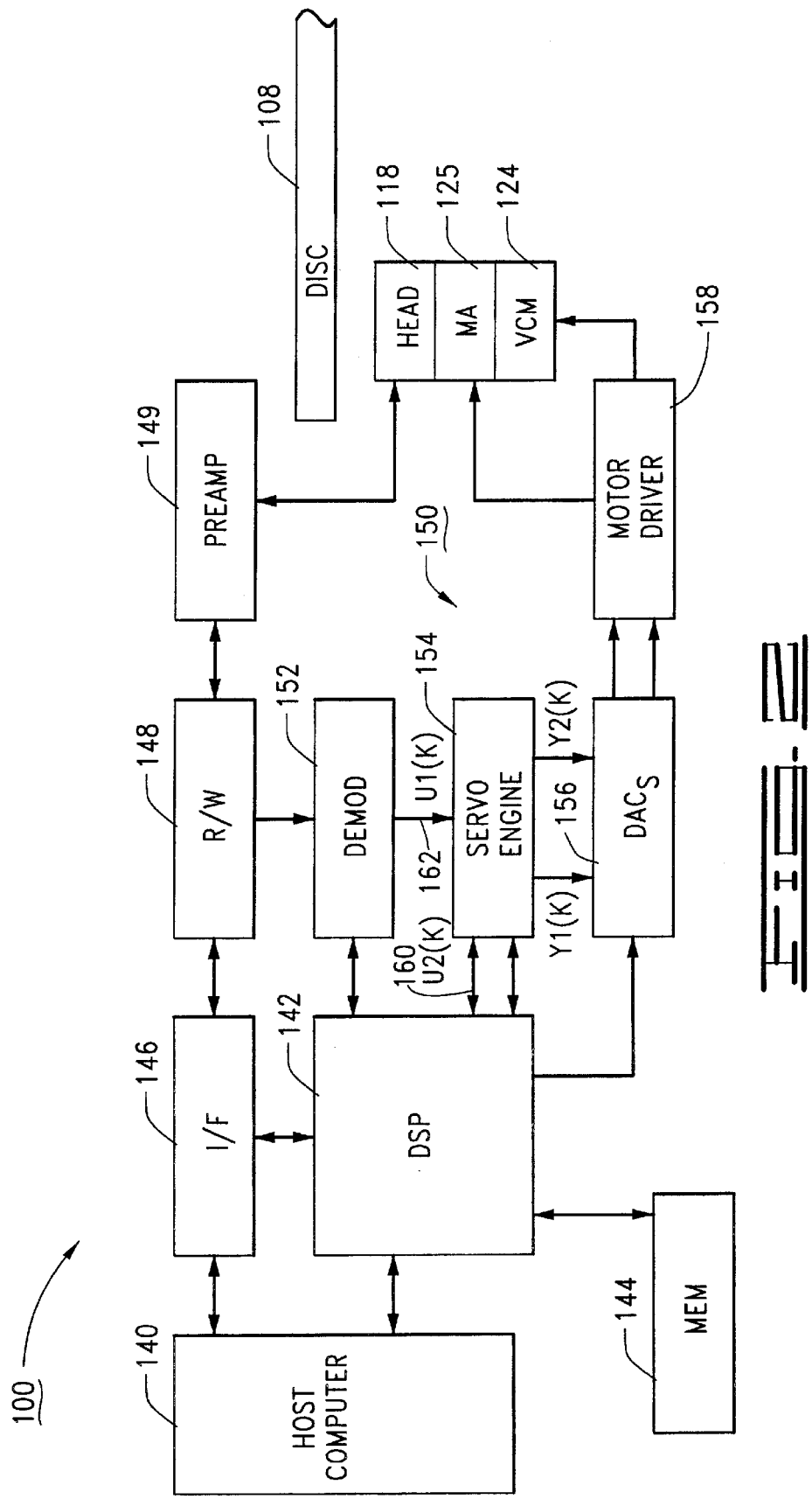
FIG. 2 is a functional block diagram of control circuitry of the disc drive of FIG. 1, including a hardware servo engine which proves servo control inputs to a microactuator (MA) and a voice coil motor (VCM) of the dual-stage actuator.

For purposes of the appended claims, the term "hardware" will be clearly understood, consistent with the foregoing discussion, to describe circuitry that carries out logical operations in accordance with the hardwired interconnections of the circuitry (such as the servo engine 154 of FIGS. 5 and 6), as compared to "firmware" or "software" which carries out logical operations in accordance with programmable steps stored in a memory device and utilized by a processing device (such as the DSP 142 of FIG. 2). Method steps are alphanumerically designated in the claims, but the scope of the claims will not be necessarily limited to the order shown.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for providing control inputs to a disc drive actuator which supports plurality of heads adjacent corresponding rotatable disc surfaces, the actuator having an actuator motor which rotates the actuator in response to the control inputs, the method comprising steps of: for each selected head from the plurality of heads, in turn,
    (a) obtaining an output response for the selected head;
    (b) selecting coefficients for an h-infinity hardware controller in relation to the output response for the selected head; and
    (c) storing the coefficients in a nonvolatile memory location of the disc drive; and thereafter, during disc drive operation,
    (d) switching to a selected head from the plurality of heads;
    (e) loading the coefficients corresponding to the selected head into a volatile memory location of the h-infinity hardware controller; and
    (f) using the h-infinity hardware controller to generate the control inputs for the actuator motor to maintain the selected head in a desired relation to the corresponding disc surface.

2. The method of claim 1, wherein the selected head of step (d) is characterized as a first head, and wherein the method further comprises steps of:
    (g) switching from the first head to the second head;
    (h) loading the coefficients corresponding to the second head into the volatile memory location of the h-infinity hardware controller; and
    (i) using the h-infinity hardware controller to generate the control inputs for the actuator motor to maintain the second head in a desired relation to the corresponding disc surface.

3. The method of claim 1, wherein the obtaining step (a) comprises a step of:
    (a1) applying an input control profile to the actuator and determining a corresponding position variation of the selected head to obtain the output response for the selected head.

4. The method of claim 1, wherein the selecting coefficients step (b) comprises steps of:
    (b1) selecting a set of matrices Ac, Bc, Cc, and Dc so that the h-infinity hardware controller generates an output Y(k) in accordance with a relationship CcX(k)+DcU(k) and a next state X(k+1) in accordance with a relationship AcX(k)+BcU(k), wherein k is a sample period, X(k) is a present state and U(k) represents input actual and desired position of the head; and
    (b2) calculating the set of coefficients for each combination of values for X(k) and U(k).

5. The method of claim 4, wherein the set of matrices Ac, Bc, Cc and Dc are characterized as bidiagonal matrices, and wherein step (b1) comprises steps of selecting an initial set of nonbidiagonal matrices and subsequently reducing the initial set into bidiagonal form.

6. The method of claim 1, wherein the actuator is characterized as a dual stage actuator so that the actuator motor comprises a primary motor that provides coarse positional control and a secondary motor that provides fine positional control, and wherein the control inputs are generated for both the primary motor and the secondary motor.

7. The method of claim 1, wherein the loading step (e) comprises steps of:

(e1) providing a special purpose random access memory having a memory module with a first half and a second half; and (e2) loading half of the coefficients into the first half of the memory module while calculating corresponding negative values for the half of the coefficients and simultaneously loading the corresponding negative values into the second half of the memory module.

8. A disc drive, comprising:

a disc pack comprising a plurality of axially aligned rotatable discs;

an actuator, comprising:
a plurality of heads supported adjacent corresponding surfaces of the discs; and
an actuator motor which rotates the actuator;

a programmable processor which controls transfer of data to the discs; and an h-infinity hardware controller, responsive to the heads and the programmable processor, which generates control inputs for the actuator motor to maintain a selected head in a desired relation to the corresponding surface, wherein the h-infinity hardware controller receives an actual position signal from the selected head, a desired position signal from the programmable processor, and a unique set of coefficients for the selected head to generate the control inputs, and wherein a different set of coefficients are loaded into the h-infinity hardware controller for each of the plurality of heads.

9. The disc drive of claim 8, wherein the programmable processor outputs control inputs to the actuator to move a selected head from an initial track to a different, destination track on the corresponding disc surface.

10. The disc drive of claim 8, further comprising a nonvolatile memory device in which the respective sets of coefficients are stored, wherein the h-infinity hardware controller comprises at least one volatile memory device which temporarily stores each of the different sets of coefficients as each of the plurality of heads is selected in turn.

11. The disc drive of claim 10, wherein the actual position signal and the desired position signal are each characterized as multi-bit digital words, and wherein the h-infinity hardware controller further comprises:

a pair of shift registers which respectively receive and serialize the actual position signal and the desired position signal to form respective serialized bit streams which are used as address inputs to the at least one volatile memory device.

12. The disc drive of claim 10, wherein the coefficients stored in the at least one volatile memory device comprise solutions to intermediate calculations of the following relation: $Y(k)=CcX(k)+DcU(k)$, where $Y(k)$ represents the control inputs to the respective primary and secondary actuator motors, $X(k)$ represents an internal state of the controller, $U(k)$ represents the actual position signal and the desired position signal, and Cc and Dc represent the coefficients.

13. The disc drive of claim 10, wherein the coefficients are selected for each selected head from the plurality of heads in turn by a method comprising steps of: (a) obtaining an output response for the selected head;

(b) selecting the coefficients for the selected head in relation to the output response for the selected head; and (c) storing the coefficients in the nonvolatile memory device.

14. The disc drive of claim 10, wherein the volatile memory device comprises a special purpose random access memory comprising:

a memory module with 2X memory locations arranged into a first half of X memory locations and a second half of X memory locations; and a data load circuit, coupled to the memory module, which receives an input sequence of X values, generates X negative values corresponding to each of the input sequence of X values, and writes each value in the input sequence of X values to the first half of the memory module while simultaneously writing the corresponding value in the X negative values to the second half of the memory module so that twice as much data are written as are provided to the special purpose random access memory.

15. The disc drive of claim 8, wherein the actuator is characterized as a dual stage actuator the actuator motor is characterized as a primary actuator motor which provides coarse head positional control and the actuator further comprises secondary actuator motor providing fine head positional control, and wherein the control inputs are applied to the primary actuator motor and the secondary actuator motor.

16. A disc drive, comprising:

a disc pack comprising a plurality of axially aligned rotatable discs;

a dual stage actuator, comprising:
a plurality of heads supported adjacent corresponding surfaces of the discs;
a primary actuator motor providing coarse head positional control; and
a secondary actuator motor providing fine head positional control; and generation means for generating respective control inputs for the primary and secondary actuator motors to maintain a selected head in a desired relation to the corresponding disc surface.

17. The disc drive of claim 16, wherein the generation means utilizes a unique set of coefficients for each of the plurality of heads.

* * * * *